United States Patent [19]
Baker et al.

[11] Patent Number: 4,890,702
[45] Date of Patent: Jan. 2, 1990

[54] BRAKE OR CLUTCH ASSEMBLY

[75] Inventors: Richard Baker, Santee; Tuan Nguyen, San Diego, both of Calif.

[73] Assignee: Sundstrand Corporation, Rockford, Ill.

[21] Appl. No.: 271,440

[22] Filed: Nov. 14, 1988

[51] Int. Cl.[4] .............................................. F16D 25/00
[52] U.S. Cl. ........................... 188/264 D; 188/264 B; 192/70.11; 192/85 AA; 277/83; 277/172
[58] Field of Search ............ 188/264 D, 264 F, 264 P, 188/264 CC, 264 B; 192/85 AA, 70.11, 70.12, 87.13, 87.18; 277/168, 172, 81 R, 83; 384/152, 153, 489

[56] References Cited

U.S. PATENT DOCUMENTS

| | | | |
|---|---|---|---|
| 2,470,883 | 5/1949 | Boissou | 277/172 |
| 2,755,901 | 7/1956 | Fippard | 192/85 AA |
| 3,028,935 | 4/1962 | Gold et al. | 188/264 D |
| 3,062,347 | 11/1962 | Hornbostel | 188/264 D |
| 3,685,842 | 8/1972 | Cyphelly | 277/83 X |
| 4,252,031 | 2/1981 | Nishimura et al. | 192/87.13 X |
| 4,514,515 | 9/1985 | Nishimura et al. | 192/85 AA |
| 4,614,259 | 9/1986 | Eguchi | 192/70.11 |
| 4,648,495 | 3/1987 | Vater et al. | 192/70.12 |
| 4,667,796 | 5/1987 | Uchibaba | 192/85 AA |
| 4,667,798 | 5/1987 | Sailer et al. | 188/264 D X |

Primary Examiner—Robert J. Oberleitner
Assistant Examiner—Matthew C. Graham
Attorney, Agent, or Firm—Wood, Dalton, Phillips, Mason & Rowe

[57] ABSTRACT

A brake or clutch assembly including a drum (18) and a transfer tube (36) for supplying hydraulic fluid to the drum (18). The transfer tube (36) includes a ring-like seal (59) for sealingly engaging the interface between the transfer tube (36) and the drum (18). A resilient O-ring (62), situated in a groove (64) on the transfer tube (36) and interposed between the ring-like seal (59) and the transfer tube (36), enables the ring-like seal (59) to cant relative to the transfer tube (36) without losing sealing engagement between the ring-like seal (59) and the transfer tube (36) and between the ring-like seal (59) and the drum (18).

15 Claims, 2 Drawing Sheets

BRAKE OR CLUTCH ASSEMBLY

FIELD OF THE INVENTION

This invention relates to brake or clutch assemblies, and more specifically, to the fluid management arrangement thereof.

BACKGROUND OF THE INVENTION

All brake or clutch assemblies include a fluid management arrangement portion wherein a member is intended for use in supplying hydraulic fluid to components within the assembly. In some brake or clutch assemblies, the member which supplies the hydraulic fluid will be a stationary member with a rotating member configured to rotate about the center line of the stationary member at a rate of speed sometimes in excess of 12,000 R.P.M.

In this particular arrangement, a seal is necessary at the interface between the stationary and rotating member to inhibit the flow of hydraulic fluid between the two members. Although the use of a seal alone is sufficient in many situations, it is not sufficient here since the rotating member may cause the seal to wobble or nutate during operation due to even minute misalignments between the members, thereby resulting in an insufficiently sealed interface.

The present invention is directed to overcoming the above problem.

SUMMARY OF THE INVENTION

It is the principal object of the invention to provide a new and improved brake or clutch assembly. More specifically, it is an object of the invention to provide a transfer tube which includes sealing means in continuous sealing engagement with a relatively rotating member, not-withstanding any misalignment which may result between the two members during the operation of the brake or clutch assembly.

An exemplary embodiment of the invention achieves the foregoing object in a brake or clutch assembly including a rotatable shaft, a first plurality of annular friction plates coupled to the shaft for rotation therewith, and a second plurality of annular friction plates arranged so that the friction plates of the first plurality alternate with the friction plates of the second plurality to form a pack. Means are provided for axially compressing the pack to drive the friction plates into engagement with each other. A drum is coupled to the second plurality of friction plates and comprises an outer member and inner member. Means including a transfer tube are provided for supplying hydraulic fluid to the drum which is relatively rotatable with respect thereto. Sealing means are provided on the transfer tube in sealing engagement with the drum inner member to seal the interface of the drum inner member and the transfer tube. The sealing means is moveable with respect to the transfer tube to provide correction for misalignment between the transfer tube and the drum inner member as relative rotation occurs. Still further, the sealing means is allowed to cant relative to the transfer tube without losing sealing engagement between the sealing means and the drum inner member.

In a highly preferred embodiment, the compressing means comprises a hydraulic fluid operated piston in fluid communication with the transfer tube.

According to the invention, the sealing means includes a ring-like seal arrangement concentric about the transfer tube which sealingly engages the drum inner member. The sealing means further includes a resilient O-ring which is interposed between and sealingly engages the ring-like seal and the transfer tube.

In the preferred embodiment, the O-ring is situated in a groove located on the transfer tube.

According to the invention, the transfer tube further includes means for restraining the ring-like seal from axial movement thereon comprising a snap ring and an abutment.

Still further, the transfer tube includes a radially expanded bell-like section including an inner and outer surface, a land in sealing engagement with the drum inner member, and a central conduit including an inner and outer surface. The central conduit inner surface is defined by a bore for the passage of lubrication fluid, and the bell-like section inner surface and the central conduit outer surface define a passage for hydraulic fluid.

Other objects and advantages will become apparent from the following specification taken in connection with the accompanying drawings.

DESCRIPTION OF THE PREFERRED EMBODIMENT

Figure 1:
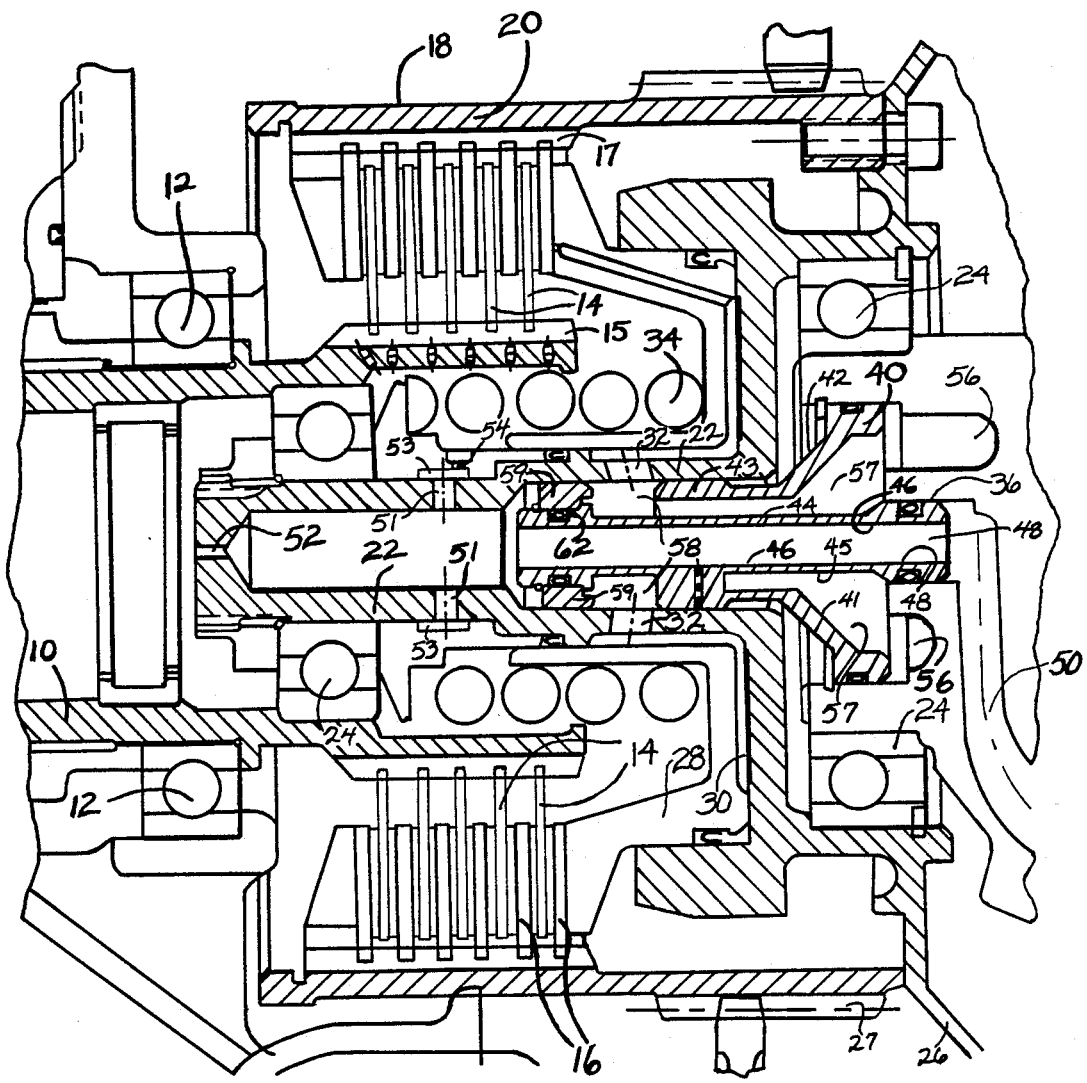
FIG. 1 is a sectional view illustrating a portion of a clutch assembly having a fluid management arrangement embodying the principles of the present invention.

An exemplary embodiment of a clutch assembly made according to the invention is illustrated in FIG. 1. Though the invention is illustrated in this context of a clutch assembly, those skilled in the art will readily appreciate that the inventive principles may be applied to brakes as well. The assembly includes a rotatable shaft 10, journaled for rotation by means of bearings 12. A first plurality of annular friction plates 14 are coupled by splines 15 to the shaft 10 for rotation therewith, while a second plurality of annular friction plates 16 are arranged so that the first and second plurality of annular friction plates 14 and 16 alternate to form a pack.

The second plurality of annular friction plates 16 are coupled by splines 17 to a drum 18 for rotation therewith. The splines 15 and 17 allow both the plates 14 and the plates 16 to move axially on the shaft 10 and the drum 18, respectively. As shown in FIG. 1, the drum 18 includes an outer member 20 and an inner member 22 which are concentric with each other about the rotational axis of the shaft 10. The second plurality of annular friction plates 16 are specifically coupled to the drum outer member 20. The drum is journaled for rotation by means of bearings 24.

A gear 26 is engaged with gear teeth 27 on the exterior of the drum outer member 20. In order to opertively couple the gear 26 with the shaft 10, means in the form of an annular hydraulic fluid operated piston 28 are provided for axially compressing the pack of first and second plurality of annular friction plates 14 and 16. Pressurized hydraulic fluid is introduced into a fluid chamber 30 in which the piston 28 is reciprocally received by way of a fluid passage 32. The pressurization of fluid chamber 30 causes the piston 28 to move axially, to the left in FIG. 1, against the bias of a spring 34. As a result of the piston's axial movement, the first and second plurality of annular friction plates 14 and 16 are compressed into frictional engagement with each other. When this occurs, relative movement between the plates 14 and 16 ceases and the gear 26 and the shaft 10 will be mechanically coupled. Upon relieving pressure in the fluid chamber 30, the spring 34 will return the piston 30 to a position wherein the first and second plurality of annular friction plates 14 and 16 are disengaged and the shaft 10 will be declutched from the gear 26. When the assembly is used as a brake, either the shaft 10 or 18 will be secured against rotation.

A transfer tube 36 includes a radially expanded bell-like section 40 including an inner surface 41, an outer surface 42, a land 43 in sealing engagement with the drum inner member 22, and a central conduit 44 including an outer surface 45 and an inner surface 46. The inner surface 46 is defined by a bore 48.

As shown in FIG. 1, lubrication fluid flows from a lubrication conduit 50 through the bore 48 and then through fluid passages 51 and 52 to provide lubricating fluid to structure within the drum 18 and the shaft 10, respectively. The passages 51 open to an annulus 53 in the drum inner member 22. The annulus 53, in turn, opens through a restricted passage 54 to the area containing the spring 34.

According to the invention, the transfer tube 36 also comprises the means for supplying the pressurized hydraulic fluid to the fluid chamber 30 by way of the fluid passage 32. As shown in FIG. 1, the hydraulic fluid flows from a source of pressurized hydraulic fluid 56 through fluid passage 57 defined by the inner surface 41 of the bell-like section 40 and the outer surface 45 of the central conduit 44. Thereafter, the hydraulic fluid flows through fluid passages 58 in the transfer tube 36 and then through the fluid passage 32.

The transfer tube 36, including the radially expanded bell-like section 40 and the central conduit 44, thus provides unique means for supplying and separating the flows of high pressurized hydraulic fluid and low pressurized lubrication fluid.

At the leftmost end of the central conduit 44 of the transfer tube 36 is located the sealing means of the present invention which operates to separate the flows of high pressurized hydraulic fluid for operating the piston 30 and low pressure fluid used solely for lubrication purpose.

Figure 2:
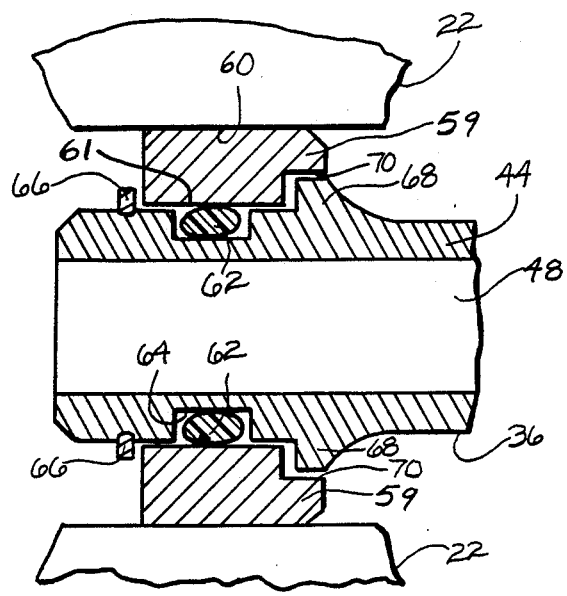
FIG. 2 is an enlarged view of the circled portion of FIG. 1.

As clearly shown in FIG. 2, the sealing means includes a ring-like seal 59 having an outer surface 60 and an inner surface 61. The ring-like seal 59 is concentric with the transfer tube 36 and its outer surface 60 sealingly engages the drum inner member 22. The sealing means further includes a compressed, resilient 0-ring 62 which is interposed between and which sealingly engages the inner surface 61 of the ring-like seal 59 and the central conduit 44 of the transfer tube 36. The 0-ring 62 is located in a groove 64 located near one end of the central conduit 44 of the transfer tube 36.

FIG. 2 also shows means for restraining the ringlike seal 59 from moving axially along the cylindrical portion 44 of the stationary transfer tube 36. The restraining means comprises a snap ring 66 on one side of the seal 59, and an abutment 68 on the other side which abuts against a shoulder 70 of the seal 59. The axial length of the seal 59 is less than the distance between the snap ring 66 and the abutment 68. Similarly, the diameter of the inner surface 61 of the seal 59 is greater than the diameter of the central conduit 44 at that location.

Figure 3:
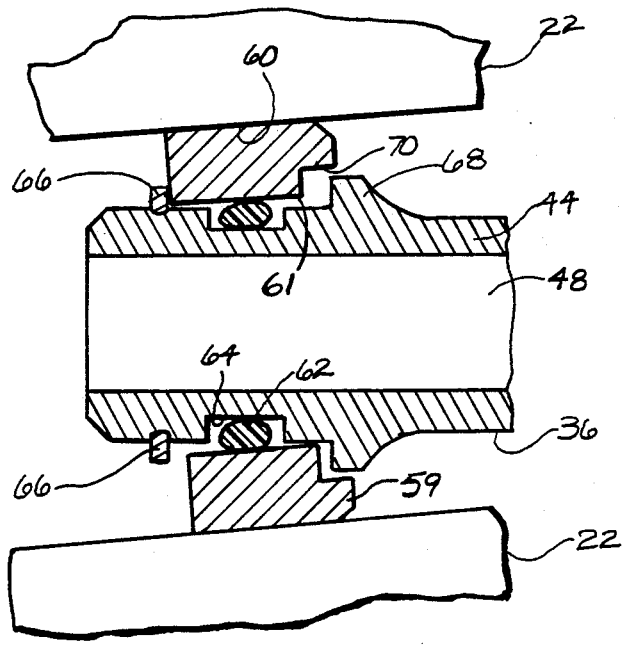
FIG. 3 is a view similar to FIG. 2, wherein the sealing of the present invention is shown in its canted position.

Consequently, as shown in FIG. 3, the ring-like seal 59 is allowed to move with respect to the transfer tube 36 to provide correction for any misalignment which may occur between the transfer tube 36 and the rotating drum inner member 22. That is, the resilient 0-ring 62 allows the ring-like seal 59 to cant relative to the transfer tube 36 without losing sealing engagement between the inner surface 61 of the ring-like seal 59 and the transfer tube 36 because of the compression of the 0-ring 62. The seal between the outer surface 60 of the ring-like seal 59 and the drum inner member 22 is maintained because the ring-like seal 59 is thus free to follow the drum inner member 22.

From the foregoing, it will be appreciated that the invention provides a sealing means for providing continuous sealing engagement between the interface of a stationary member and a rotating member notwithstanding the misalignment which may occur between the two members during operation.

We claim:

1. A brake or clutch assembly comprising:
   a rotatable shaft;
   a first plurality of annular friction plates coupled to said shaft for rotation therewith;
   a second plurality of annular friction plates, said friction plates being arranged so that friction plates of said first plurality alternate with the friction plates of said second plurality to form a pack; means for axially compressing said pack to drive said friction into engagement with each other;
   a drum coupled to said second plurality of friction plates comprising an outer member and an inner member;
   means including a transfer tube for supplying hydraulic fluid to said drum which is relatively rotatable with respect thereto;
   sealing means, including a rigid sealing ring on and rotatable with said transfer tube, in sealing engagement with said drum inner member to seal the interface of said drum inner member and said transfer tube to provide correction for misalignment between said transfer tube and said drum inner member as relative rotation between said sealing ring and said drum occurs; and
   said sealing ring being allowed to cant relative to said transfer tube without losing sealing engagement between said sealing means and said transfer tube and between said sealing means and said drum inner member.

2. The brake or clutch assembly of claim 1 wherein said compressing means comprises a hydraulic fluid operated piston in fluid communication with said transfer tube.

3. The brake or clutch assembly of claim 1 wherein:
   said sealing means includes a ring-like seal having an inner diameter greater than the outside diameter of the transfer tube arranged concentric about said transfer tube and sealingly engaging said drum inner member, and a resilient O-ring interposed between and sealingly engaging said ring-like seal and said transfer tube.

4. The brake or clutch assembly of claim 3 wherein said transfer tube further includes means for restraining said ring-like seal from axial movement thereon.

5. The brake or clutch assembly of claim 4 wherein said restraining means comprises a snap ring and an abutment.

6. A brake or clutch assembly comprising:
   a rotatable shaft;
   a first plurality of annular friction plates coupled to said shaft for rotation therewith;

a second plurality of annular friction plates, said friction plates being arranged so that friction plates of said first plurality alternate with the friction plates of said second plurality to form a pack;
means for axially compressing said pack to drive said friction plates into engagement with each other;
a drum coupled to said second plurality of friction plates comprising an outer member and an inner member;
means including a transfer tube for supplying hydraulic fluid to said drum which is relative rotatable with respect thereto;
sealing means on said transfer tube in sealing engagement with said drum inner member to seal the interface of said drum inner member and said transfer tube and being moveable with respect to said transfer tube to provide correction for misalignment between said transfer tube and said drum inner member as relative rotation occurs;
said sealing means including a ring-like seal arranged concentric about said transfer tube and sealingly engaging said drum inner member, and a resilient O-ring interposed between and sealingly engaging said ring-like seal and said transfer tube, said O-ring being situated in a groove located on said transfer tube;
said sealing ring being allowed to cant relative to said transfer tube without losing sealing engagement between said sealing means and said transfer tube and between said sealing means and said drum inner member.

7. A brake or clutch assembly comprising:
a rotatable shaft;
a first plurality of annular friction plates coupled to said shaft for rotation therewith;
a second plurality of annular friction plates, said friction plates being arranged so that friction plates of said first plurality alternate with the friction plates of said second plurality to form a pack;
means for axially compressing said pack to drive said friction plates into engagement with each other;
a drum coupled to said second plurality of friction plates comprising an outer member and an inner member;
means including a transfer tube for supplying hydraulic fluid to said drum which is relatively rotatable with respect thereto, said transfer tube including a radially expanded bell-like section including an inner and outer surface, a land in sealing engagement with the drum inner member, and a central conduit including an inner and outer surface, said central conduit inner surface being defined by a bore for the passage of lubrication fluid, and said bell-like section inner surface and said central conduit outer surface defining a passage for said hydraulic fluid;
sealing means on said transfer tube in sealing engagement with said drum inner member to seal the interface of said drum inner member and said transfer tube and being moveable with respect to said transfer tube to provide correction for misalignment between said transfer tube and said drum inner member as relative rotation occurs; and
said sealing means being allowed to cant relative to said transfer tube without losing sealing engagement between said means and said transfer tube and between said sealing means and said drum inner member.

8. A brake or clutch assembly comprising:
a rotatable shaft;
a first plurality of annular friction plates coupled to said shaft for rotation therewith;
a second plurality of annular friction plates, said friction plates being arranged so that friction plates of said first plurality alternate with the friction plates of said second plurality to form a pack;
means for axially compressing said pack to drive said friction plates into engagement with each other;
a drum coupled to said second plurality of friction plates comprising an outer member and an inner member;
means including a transfer tube for supplying hydraulic fluid to said drum which is relatively rotatable with respect thereto;
sealing means on said transfer tube in sealing engagement with said drum inner member to seal the interface of said drum inner member and said transfer tube and being moveable with respect to said transfer tube to provide correction for misalignment between said transfer tube and said drum inner member as relative rotation occurs;
said sealing means including a ring-like seal arranged concentric about said transfer tube and sealingly engaging said drum inner member and a resilient O-ring situated in a groove on said transfer tube interposed between said ring-like seal and said transfer tube; and
whereby said O-ring enables said ring-like seal to cant relative to said transfer tube without losing sealing engagement between said ring-like seal and said transfer tube and between said ring-like seal and said drum inner member.

9. The brake or clutch assembly of claim 8 wherein said compressing means comprises a hydraulic fluid operated piston in fluid communication with said transfer tube.

10. The brake or clutch assembly of claim 8 wherein said transfer tube further includes means for restraining said ring-like seal from axial movement thereon.

11. The brake or clutch assembly of claim 10 wherein said restraining means comprises a snap ring and an abutment.

12. The brake or clutch assembly of claim 8 wherein said transfer tube includes a radially expanded bell-like section including an inner and outer surface, a land in sealing engagement with the drum inner member, and a central conduit including an inner and outer surface, said central conduit inner surface being defined by a bore for the passage of lubrication fluid, and said bell-like section inner surface and said central conduit outer surface defining a passage for said hydraulic fluid.

13. A brake or clutch assembly comprising:
a rotatable shaft;
a first plurality of annular friction plates coupled to said shaft for rotation therewith;
a second plurality of annular friction plates, said friction plates being arranged so that friction plates of said first plurality alternate with the friction plates of said second plurality to form a pack;
a hydraulic fluid operated piston for compressing said pack to drive said friction plates into engagement;
a drum coupled to said second plurality of friction plates comprising an outer member and an inner member;

means including a transfer tube for supplying hydraulic fluid to said drum which is relatively rotatable with respect thereto;

sealing means on said transfer tube in sealing engagement with said drum inner member to seal the interface of said drum inner member and said transfer tube and being moveable with respect to said transfer tube to provide correction for misalignment between said transfer tube and said drum inner member as relative rotation occurs;

said sealing means including a ring-like seal arranged concentric about said transfer tube and slidably and sealingly engaging said drum inner member and a resilient O-ring interposed between and sealingly engaging said ring-like seal and said transfer tube; and means on said transfer tube to restrain said ring-like member from axial movement thereon;

whereby said O-ring enables said ring-like seal to cant relative to said transfer tube without losing sealing engagement between said ring-like seal and said transfer tube and between said ring-like seal and said drum inner member.

14. The brake or clutch assembly of claim 13 wherein said restraining means comprises a snap ring and an abutment.

15. The brake or clutch assembly of claim 13 wherein said transfer tube includes a radially expanded bell-like section including an inner and outer surface, a land in sealing engagement with the drum inner member, and a central conduit including an inner and outer surface, said central conduit inner surface being defined by a bore for the passage of lubrication fluid, and said bell-like section inner surface and said central conduit outer surface defining a passage for said hydraulic fluid.

* * * * *